Patented Sept. 5, 1933

1,925,310

UNITED STATES PATENT OFFICE 1,925,310

MANUFACTURE OF CELLULOSE DERIVATIVES

Henry Dreyfus, London, England

No Drawing. Application October 28, 1929, Serial No. 403,139, and in Great Britain November 23, 1928

8 Claims. (Cl. 260—101)

This invention relates to a new process for the manufacture of cellulose derivatives.

According to the present invention cellulose derivatives are prepared by reacting upon cellulosic materials with esters of organic acids in presence of organic bases.

In so far as I am aware the conversion of cellulosic materials into cellulose derivatives by treatment with esters of organic acids is an entirely new chemical process and has had no parallel in the production of cellulose derivatives.

The cellulosic materials are preferably heated to a comparatively high temperature with the esters and the bases in order to bring about the reaction. While pressure may be used for the reaction, more particularly with comparatively low boiling esters and/or bases, the reaction may be conducted under atmospheric pressure, especially when using esters and bases of high or comparatively high boiling point. The reaction may furthermore be conducted with the esters and/or bases in the gaseous or vapour state, for example by passing the mixed vapours of an ester and a base through the cellulosic material maintained at the desired temperature.

The following are examples of esters which may be used: Methyl acetate, ethyl acetate, amyl acetate, benzyl acetate, meta- and para-xylenyl acetates, ethyl laurate, diethyl oxalate, dimethyl and diethyl malonates, dimethyl and diethyl succinates and ethyl ethoxy acetate. The invention is however by no means limited to these bodies.

As bases I prefer to employ tertiary organic bases, for example aromatic bases such as dialkyl anilines or naphthylamines and their homologues, heterocyclic bases such as pyridine and its alkyl derivatives, the N-alkyl or aryl derivatives of piperidine and quinoline and its alkyl derivatives, and aliphatic bases such as dimethyl-n-hexylamine and iso-amyl diethylamine. The stronger bases, such as the alkyl piperidines and dimethyl-n-hexylamine, are preferred. Aliphatic and other bases of lower boiling point may be employed, for example under pressure or in vapour form.

As starting materials cellulose or its conversion products or materials containing cellulose or derivatives thereof containing one or more free hydroxy groups, for instance partially esterfied or etherified products, may be employed. Wood pulps or other materials such as bamboo or esparto containing encrusting matter from which the lignin, pentosan, resin and like constituents have been substantially removed, as for example in soda pulp, sulphite pulp or sulphate pulp may be converted into cellulose derivatives by the present process, but are preferably first subjected to a pretreatment as described in my prior U. S. Patent specification No. 1,711,110, involving firstly an alkaline purifying treatment followed by a treatment with organic carboxylic acids. The alkaline purifying treatment may for example be effected with caustic alkali of low concentration such as 3% or under, with heating or boiling or with caustic alkali of higher concentration such as 5 to 10% or more in the cold or with only slight heating.

Fibres, fabrics and the like, for instance of cotton or other natural cellulosic material or of viscose artificial silk or other regenerated cellulosic fibres, may be treated by the present processes.

Raw cellulose or materials containing cellulose, before subjection to the present processes, may be pretreated in any desired manner. For example they may be pretreated with caustic alkali, preferably under such conditions that while no serious degradation takes place any foreign matter is removed, or they may be pretreated with organic and/or inorganic acids, for example formic acid, acetic acid or hydrochloric acid. Such pretreatments with organic or inorganic acids may for example be carried out in the manner described in my French specification No. 565,654 or my U. S. specifications Nos. 66,103 filed 31st October 1928, and 328,306 filed 24th December, 1928.

In the case of pretreating with acids in this manner such acids are preferably removed before subjecting the materials to the processes of the present invention.

Another form of pretreatment which I have found particularly effective in opening up or rendering the cellulosic materials more reactive towards the processes of the present invention is a treatment with organic bases, for example any of the organic bases referred to above. Such pretreatment may for example be carried out by heating the cellulose at temperatures above 100° C. in the liquid organic base. Alternatively however the vapours of the organic base may be passed through the cellulosic materials.

The reaction between the cellulosic or other starting materials and the organic acid esters may be effected in any desired manner. For example the cellulose or the like may be heated, for instance at 140° to 200° C., in a mixture of the ester and the base in the liquid phase with or without a diluent. Preferably, however, the reaction is effected by passing vapours of the desired ester through the cellulose immersed in the heated liquid organic base or through the cellulose which has been previously heated with the organic base and separated therefrom, or by passing the vapours of the ester through the cellulose either dry or immersed in an inert diluent, the organic base being applied either in vapour form together with the ester or being used in admixture with the inert diluent.

In the case of using liquid reagents the reaction may be carried out under a reflux condenser. Alternatively it may be carried out under pressure either when using the reagents in the liquid phase or the vapor phase.

The processes of the present invention may be combined with the esterification processes described in my British application No. 34,173/28 filed 21st November, 1928 and the corresponding U. S. application S. No. 403,138 filed October 28, 1929, in which cellulosic materials are esterified by means of organic acid anhydrides in presence of bases. The two types of process may be carried out consecutively or simultaneously.

The most important application of the present invention is for the production of cellulose derivatives which will serve as starting materials for acetylation or other esterification or for etherification. This subsequent esterification or etherification may be effected by any suitable method, for example the methods described in my prior Patent No. 1,708,787 and applications S. Nos. 301,928 filed 24th August, '28, 301,929 filed 24th August, '28, 301,927 filed 24th August, '28, 321,750 filed 24th November, '28 and 321,751 filed 24th November, '28, in the case of cellulose esters, or in my prior U. S. application No. 401,381 filed 5th August, '29 and U. S. Patents 1,451,330 filed 5th August, '20, 1,451,331 filed 5th August, '20, 1,502,379 filed 25th April, '21, 1,501,207 filed 12th September, '20, 1,542,541 filed 1st March, '22, and 1,688,532 filed 16th September, '26, in the case of cellulose ethers.

The following examples illustrate the invention but are not to be considered as limiting it in any way:—

*Example 1*

100 parts of cotton linters and 600 parts of dimethyl-n-hexylamine are introduced into a vessel fitted with a reflux condenser and the base boiled for 1–2 hours. Isoamyl acetate vapour, generated by boiling isoamyl acetate in a separate vessel, is conducted into the vessel containing the cellulose and the organic base, the whole being gently boiled under reflux. After 5–12 hours the cellulose material may be removed, and the liquor expressed therefrom. The material is then ready for conversion into any desired cellulose derivatives.

For the production therefrom of a high grade cellulose acetate, the material, hydroextracted and dried, is introduced into a mixture of 250 parts of acetic anhydride and 600 parts of glacial acetic acid containing 5–8 parts of sulphuric acid. The acetylation is continued until solution is complete when the cellulose acetate may be worked up in the usual manner.

*Example 2*

100 parts of cotton linters are introduced into a pressure vessel containing 200 parts of methyl acetate and 600 parts of methylpiperidine. The whole is heated under pressure for 8–20 hours at a temperature of 140–170° C. The cellulosic material thus treated may be worked up into cellulose derivatives by any suitable method, for example that described in Example 1 above.

Shorter or longer times than those indicated above may of course be employed for the treatment and any other desired esters or bases may be substituted for those indicated.

The cellulose derivatives produced by the present invention may be used for the production of artificial silks or fibres, films, lacquers, plastic masses, moulding powders and the like. For these purposes the cellulose derivatives may, if desired, be subjected to secondary treatments for the purpose of conferring upon them other solubility characteristics which may be desirable for using them commercially. For example they may be subjected to the action of inorganic or organic acids, acid salts, organic bases or salts thereof or the like in solution or suspension.

What I claim and desire to secure by Letters Patent is:—

1. Process for the production of cellulose derivatives, comprising treating materials consisting essentially of cellulose with esters of organic acids in presence of tertiary organic bases at pressures greater than atmospheric pressure.

2. Process for the production of cellulose derivatives, comprising treating materials consisting essentially of cellulose with esters of organic acids in presence of tertiary organic bases at temperatures between 140° C–200° C.

3. Process for the production of cellulose derivatives, comprising treating materials consisting essentially of cellulose with esters of organic acids in presence of strong tertiary organic bases.

4. Process for the production of cellulose derivatives, comprising treating materials consisting essentially of cellulose with esters of organic acids in presence of strong tertiary organic bases at temperatures above 100° C.

5. Process for the production of cellulose derivatives comprising treating materials consisting essentially of cellulose with alkyl acetates in the presence of tertiary organic bases.

6. Process for the production of cellulose derivatives, comprising treating materials consisting essentially of cellulose with esters of organic acids in presence of tertiary organic bases, and subsequently subjecting them to further treatment to produce other organic derivatives of cellulose.

7. Process for the production of cellulose derivatives, comprising treating materials consisting essentially of cellulose with esters of organic acids in presence of tertiary organic bases, and subsequently subjecting them to acetylation.

8. Process for the production of cellulose derivatives, comprising treating materials consisting essentially of cellulose with alkyl acetates in the presence of strong tertiary organic bases at temperatures above 100° C., and subsequently subjecting them to acetylation.

HENRY DREYFUS.